(12) United States Patent
Khadilkar et al.

(10) Patent No.: US 8,490,003 B2
(45) Date of Patent: Jul. 16, 2013

(54) DYNAMIC PROXIMITY BASED TEXT EXCHANGE WITHIN A GROUP SESSION

(75) Inventors: Yogeshwar B. Khadilkar, Pune (IN); Anurag Srivastava, Pune (IN); Dhanashree Srivastava, Pune (IN)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 12/959,494

(22) Filed: Dec. 3, 2010

(65) Prior Publication Data

US 2012/0144318 A1    Jun. 7, 2012

(51) Int. Cl.
*G06F 3/00* (2006.01)
(52) U.S. Cl.
USPC ............................ 715/753; 715/739; 715/748
(58) Field of Classification Search
USPC ......................................... 715/753, 739, 748
See application file for complete search history.

(56) References Cited

U.S. PATENT DOCUMENTS

| | | | | |
|---|---|---|---|---|
| 5,896,321 A * | 4/1999 | Miller et al. | ............ | 365/189.15 |
| 5,959,629 A * | 9/1999 | Masui | ............ | 715/808 |
| 6,008,799 A * | 12/1999 | Van Kleeck | ............ | 345/173 |
| 6,026,396 A * | 2/2000 | Hall | ............ | 1/1 |
| 6,208,339 B1 * | 3/2001 | Atlas et al. | ............ | 715/780 |
| 6,564,213 B1 * | 5/2003 | Ortega et al. | ............ | 1/1 |
| 6,829,607 B1 * | 12/2004 | Tafoya et al. | ............ | 1/1 |
| 7,185,271 B2 * | 2/2007 | Lee et al. | ............ | 715/226 |
| 7,478,129 B1 | 1/2009 | Chemtob | | |
| 8,209,680 B1 * | 6/2012 | Le et al. | ............ | 717/174 |
| 8,244,836 B2 * | 8/2012 | Dehaan | ............ | 709/220 |
| 8,364,802 B1 * | 1/2013 | Keagy et al. | ............ | 709/223 |
| 8,370,835 B2 * | 2/2013 | Dittmer | ............ | 718/1 |
| 2002/0075309 A1 * | 6/2002 | Michelman et al. | ............ | 345/764 |
| 2002/0118221 A1 * | 8/2002 | Hudson et al. | ............ | 345/711 |
| 2003/0033288 A1 * | 2/2003 | Shanahan et al. | ............ | 707/3 |
| 2005/0283468 A1 * | 12/2005 | Kamvar et al. | ............ | 707/3 |
| 2006/0041745 A1 | 2/2006 | Parnes | | |
| 2007/0053308 A1 | 3/2007 | DuMas et al. | | |
| 2009/0059922 A1 | 3/2009 | Appelman et al. | | |
| 2012/0158920 A1 * | 6/2012 | Yang | ............ | 709/220 |
| 2012/0311579 A1 * | 12/2012 | Lee et al. | ............ | 718/1 |
| 2013/0055256 A1 * | 2/2013 | Banga et al. | ............ | 718/1 |

\* cited by examiner

*Primary Examiner* — David Phantana Angkool
(74) *Attorney, Agent, or Firm* — Patents on Demand, P.A.; Brian K. Buchheit; Scott M. Garrett

(57) ABSTRACT

A text exchange associated with a distance value n can be received. The text exchange can be conveyed by a text exchange application which can be linked to a group session. The group session can comprise of one or more participants each associated with a proximity value m. The text exchange can be a real-time text based communication between one or more computing devices. A participant can be determined to receive the text exchange based on the distance value of the text exchange and the proximity value associated with the participant. The text exchange can be communicated to a computing device utilized by the participant when the proximity value is equivalent to the distance value. The text exchange can be presented in a visually and/or aurally distinct manner within an interface of the text exchange application.

20 Claims, 3 Drawing Sheets

DYNAMIC PROXIMITY BASED TEXT EXCHANGE WITHIN A GROUP SESSION

BACKGROUND

The present invention relates to real-time text based communications (e.g., instant messaging and chat) and, more particularly, to dynamic proximity based text exchanges or messaging within a group session.

A number of different forms of real-time text based communication techniques exist, such as instant messaging, chat, mobile text messaging, and the like. Some of these text exchange technologies permit group sessions, where three or more people can concurrently exchange text in real-time. Additionally, some of these text exchange technologies permit an exchange of video, voice, and other forms of communication in addition to text. Throughout the disclosure, the term "text exchange" and "group text exchange" has been used to generically refer to the real-time exchange of text using any of a variety of specific technologies (chat based technologies, instant messaging technologies, mobile text messaging technologies, etc.) In places where specific examples are given, specific types of text exchanges have been referenced, but it should be understood that those examples are non-limiting and that other forms of text exchange communication can be substituted for those examples.

Traditional real-time text exchange (text exchange, chat, etc.) tools available in market today support a one to one sessions as well as multi-person or group sessions. Group sessions allow people to have text-based conversations with multiple people simultaneously. Some applications allow passive participation where a user can be added as observer, such that the user can only view the exchanged text messages but cannot participate (e.g., send messages). In all cases, messages from any participant within a group are broadcast to all other participants of the text exchange session (e.g., every participants can view every message that another participant sends out).

Many times during a group text exchange session, participants prefer to communicate some messages to a subset of the participants (e.g., observers, team members) associated with the group. For instance, a moderator of a group session cannot have a private discussion with a sub-group of participants easily. Currently, available chat tools require a user to start a new communication session with the intended set of two or more communicators. This creates additional overhead on the user, as well as the server (e.g., additional chat or text exchange session). Frequently, the user can lose context when switching between multiple sessions. Further, users are prone to using the wrong session's communication interface and sending a message to unintended recipients.

SUMMARY

According to one embodiment of the present invention a text exchange associated with a distance value n can be received. The text exchange can be conveyed by a text exchange application which can be linked to a group session. The group session can include one or more participants each associated with a proximity value m. The text exchange can be a real-time text based communication between one or more computing devices. A participant can be determined to receive the text exchange based on the distance value of the text exchange and the proximity value associated with the participant. The text exchange can be communicated to a computing device utilized by the participant when the proximity value is equivalent to the distance value. The text exchange can be presented in a visually and/or aurally distinct manner within an interface of the text exchange application.

DETAILED DESCRIPTION

Figure 1:
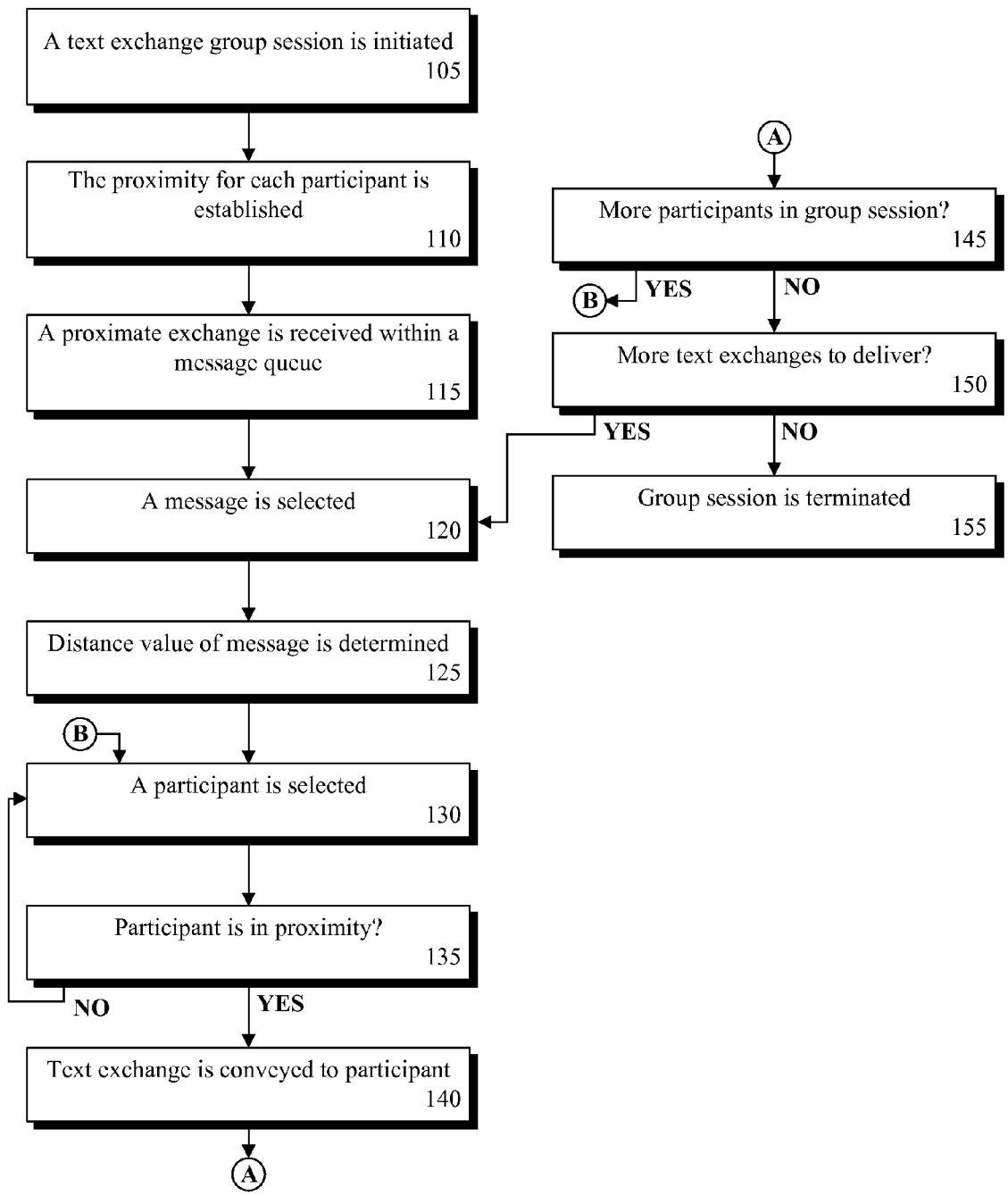
FIG. 1 is a flowchart illustrating a method for dynamic proximity based text exchanges or messaging within a group session in accordance with an embodiment of the inventive arrangements disclosed herein.

The present disclosure is a solution for dynamic proximity based text exchange within a group session. In the solution, participants within a group session (e.g., group text exchange) can be assigned proximity values (e.g., integer value). In one instance, the proximity values can be linked to real-world relationships. Relationships can include, but is not limited to, physical distance between participants, geographic location, presence information, metrics, security permissions, and the like. Distance values can be utilized to permit selected text exchanges to be conveyed to one or more sub-group of participants of the group session. In one embodiment, a moderator of a group session can private exchange any participant (e.g., private conversation) and/or participants within the group session by utilizing a distance value. For instance, a text exchange with a distance value of three can be conveyed to each participant associated with the proximity value of three or less. That is, the solution can enable real-world conversational scenarios to occur where a participant close to a speaker can hear the speaker, but a participant further away from the speaker cannot. In one embodiment, the solution can also represent a bandwidth conservative fashion for conducting chat communications, as distance is a significant factor in network bandwidth consumption. Thus, distance-dependent actions as described herein can represent a novel bandwidth optimization technique for handling chat and instant messaging traffic.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a flowchart illustrating a method 100 for dynamic proximity based text exchanges or messaging within a group session in accordance with an embodiment of the inventive arrangements disclosed herein. In method 100, participants of a text exchange based group session (e.g., online chat) can dynamically communicate private exchanges to sub-groups within the group session. Dynamic communication of private exchanges within the group session can be enabled through proximity mechanisms associated with a text exchange and a participant. A text exchange can be assigned a distance value (e.g., proximate exchange) which can be programmatically evaluated against proximity values associated with a participant. Based on the evaluation, the text exchange can be conveyed to a participant (e.g., private exchange), and/or multiple participants (e.g., private group exchange). For example, a proximate exchange with a distance value of three can be communicated to participants associated with a proximity value of three or less. That is, the text exchange can be conveyed to selected participants of the group session automatically without requiring manual selection of the participants.

As used herein, a group session can include a set of three or more participants communicating within a text exchange session. A group session can include a semi-permanent real-time text based communication between three or more participants utilizing multiple computing devices. The group session can be associated with a text exchange application which can execute on a computing device.

As used herein, text exchange can include, but is not limited to, Extensible Messaging and Presence Protocol (XMPP), Session Initiated Protocol for Instant Messaging and Presence Leveraging Extensions (SIMPLE), Application Exchange (APEX), Instant Messaging and Presence Service (IMPS), Mobile Instant Message, and the like. Text exchange application can include, but is not limited to, IBM LOTUS SAMETIME, GOOGLE TALK, and the like.

As used herein, distance and proximity values can include real-number values which can be programmatically evaluated. In one instance, distance and/or proximity can include integer values. In another instance, distance and/or proximity values can include alphanumeric characters, words, geographic locations, presence information, metrics, security permissions, and the like. For simplicity, the correlation between proximity and distance can be a one-to-one correspondence. However, it should be appreciated that the disclosure is not limited in this regard. Traditional and/or proprietary algorithms can be used to determine/evaluate proximity and/or distance dynamically within a text exchange group session. In one embodiment, proximity and/or distance values can be computed in real-time or near real-time.

In one instance, proximity values can correspond to traditional proxemics values including, but not limited to, intimate distance, personal distance, social distance, public distance, and the like. For example, a scale from one to four can be utilized to distinguish intimate distance (e.g., one) from public distance (e.g., four).

In one embodiment, distance values can represent a "loudness" value commonly associated with speech. For example, a scale range from negative one (e.g., whisper) to positive one (e.g., shouting) can be used to indicate a participant speaking volume.

It should be noted that the invention can support private exchanges for a single participant (e.g., a moderator) and/or multiple participants. In one embodiment, the disclosure can support single participant private exchanges within a group session. In the embodiment, only a participant with moderator status can communicate private exchanges to a subgroup of participants within the group session.

In step 105, a text exchange group session is initiated. The session can be initiated by a moderator and/or a group session participant. The group session can be a text exchange session which can conform to traditional and/or proprietary text exchange conventions. Conventions can include, timestamp information, user identity, user avatar, file transfer, status toggling, international language support, video capabilities, audio features, emoticons, and the like. The conventions can be maintained when a text exchange is conveyed as a private exchange to a selected participant of the group session.

In step 110, a proximity value for each participant can be established. The proximity value can be established manually and/or automatically based on text exchange application settings, user preferences, and the like. For example, the proximity value for each participant can be determined based on the geographic location of the participant. In one instance, a proximity list can be generated to track the proximity value of each participant within the group session. In the instance, the proximity list can permit repeated rapid proximity assessment of each participant.

In step 115, a proximate exchange can be received within a text exchange queue. For example, the text exchange queue can be a text exchange server message queue. In step 120, a text exchange can be selected from the message queue. The text exchange can be selected based on traditional and/or proprietary mechanisms. Mechanisms can include, but is not limited to, First In First Out (FIFO), Last In First Out (LIFO), and the like. In step 125, the distance value of the selected text exchange is determined. The determination can be performed by analyzing text exchange contents. In one embodiment, the text exchange can be parsed for user specified notation indicating the distance value of the text exchange. For instance, prefixing a text exchange with the notation "@3" can set the distance value of the text exchange to be communicated to participants which belong to tier level three technical support. It should be noted, a text exchanges communicated to a sub-group of participants within the group session can be referred to as private exchange.

In step 130, a participant of the group session is selected. Selection of participant can be performed alphabetically, chronologically, numerically (e.g., by proximity value), and the like. In step 135, if the participant is in proximity the method can continue to step 140, else return to step 130. The distance value of the private exchange can be evaluated against the proximity value associated with the participant. In one instance, a direct comparison (e.g., integer comparison) can be performed to determine if the participant is within proximity.

In step 140, the private exchange can be conveyed to the participant. The private exchange can be presented upon an interface which the participant can view. In one embodiment, the text exchange can be presented within a chat window interface visually distinct from a conventional text exchange. For instance, the private exchange can be presented in italics indicating the text exchange is not visible to all participants of the group session. In step 145, if more participants are present in the text exchange session, the method can return to step 130, else continue to step 150. In step 150, if there are more text exchanges to deliver, the method can proceed to step 120, else continue to step 155. In step 155, the text exchange group session can be terminated.

Steps 130-145 can be performed for each participant within the group session until each appropriate participant receives a copy of the proximate exchange (e.g., as a private exchange). Steps 120-150 can be performed continuously throughout the lifetime of the group session. Drawings presented herein are for illustrative purposes only and should not be construed to limit the invention in any regard. In one embodiment, the disclosure can support contextual settings. A context can be a mechanism which can permit multiple proximity values to be assigned to participants based on one or more criteria. Criteria can include, but is not limited to, participant relationships, group session settings, and the like. Context can include, but is not limited to, organizational hierarchies (e.g., enterprise hierarchy), social structures (e.g., social networks), and the like. It should be appreciated that proximity values and/or distance values can include negative values which can be useful for distinguishing contexts.

It should be appreciated that a private exchange can be associated with one or more artifacts including audio, video, documents, and the like. For example, method 100 can be permit a file to be transferred to a sub-group of participants within the group session.

Figure 2:
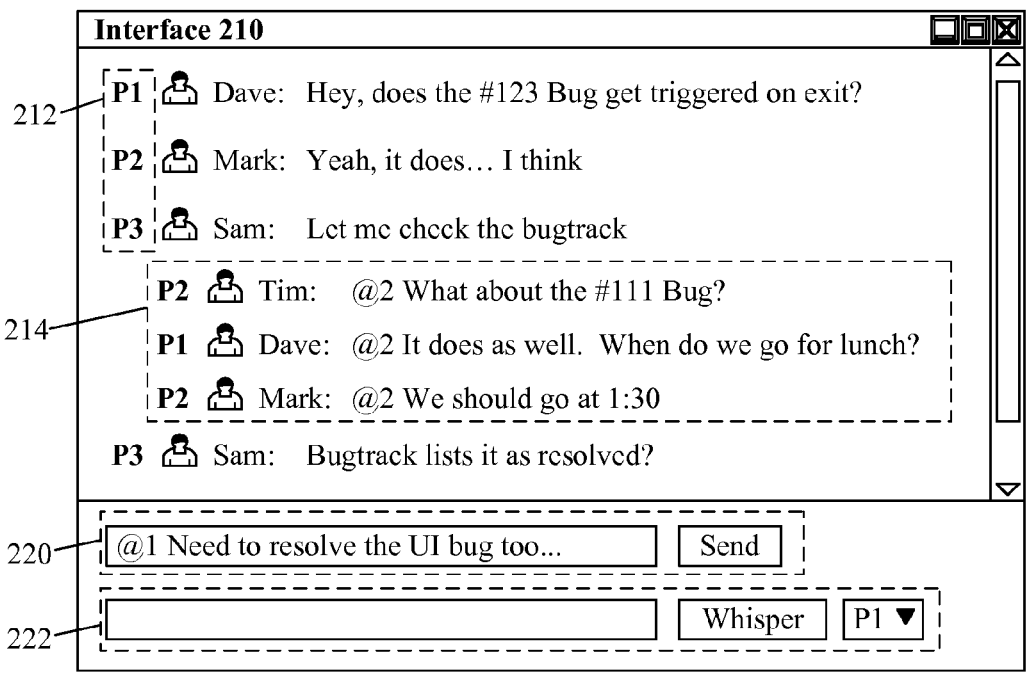
FIG. 2 is a schematic diagram illustrating a set of interfaces for dynamic proximity based text exchanges or messaging within a group session in accordance with an embodiment of the inventive arrangements disclosed herein.
Figure 2:
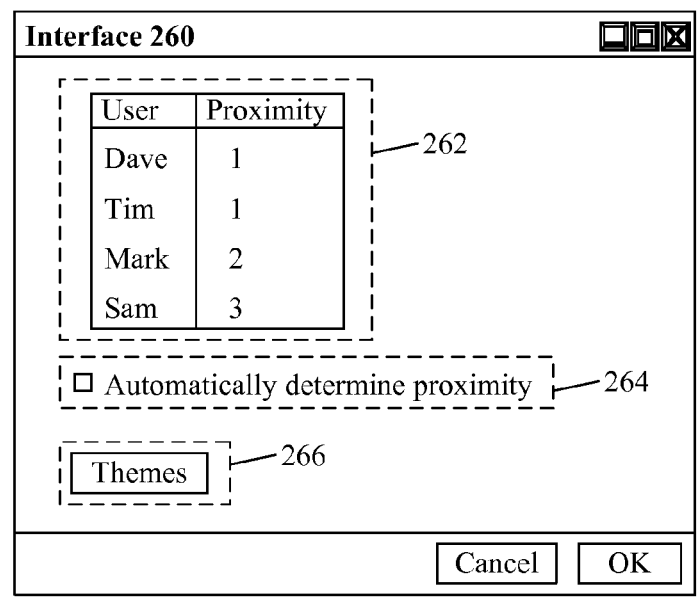

FIG. 2 is a schematic diagram illustrating a set of interfaces 210, 260 for dynamic proximity based text exchanges or messaging within a group session in accordance with an embodiment of the inventive arrangements disclosed herein. In interface 210, a chat window can present private and non-private (e.g., traditional) text exchanges within a group session. In interface 260, configuration parameters for a proximity based text exchange group session can be presented.

Interface 210 can be a chat window of a text exchange application with group session capabilities. Interface 210 can comprise of, but is not limited to, proximity indicator 212, private conversation 214, section 220, section 222, and the like. Interface 210 can include traditional components including, but not limited to, tabs, pull down menus, and the like. Interface 210 can support markup language including, but not limited to, Hypertext Markup Language (HTML), Extensible Markup Language (XML), and the like.

Proximity indicator 212 can be one or more visual symbols and/or aural indicators. In one instance, indicator 212 can be an editable text field permitting rapid modification of participant proximity. In another instance, indicator 212 can be a non-modifiable text entity For example, indicator 212 can be an alphanumeric value such as P1 denoting a proximity value of one. Indicator 212 can conform to any traditional and/or proprietary font face, family, size, color, and the like. In one embodiment, indicator 212 can be a graphic icon representing different proximity values. In another embodiment, indicator 212 can include a color scheme. For example, indicator 212 can include familiar color schemes such as green, yellow, and red representing low proximity, medium proximity, and high proximity.

Private conversation 214 can be one or more private exchanges between participants of a group session. The private exchanges can be visually and/or aurally distinguished from traditional text exchanges in one or more means. In one instance, conversation 214 can be partially indented indicating a communication with a sub-group. In another instance, one or more themes can be associated with conversation 214 including, but not limited to, visual themes, aural themes, and the like. Visual themes can include fonting motifs, color schemes, graphical artifacts, and the like. In one embodiment, text exchange distance values (e.g., @2) can be optionally presented adjacent to private exchanges within the private conversation 214. It should be appreciated, text exchange distance values can be presented for traditional text exchanges but can be omitted to maintain user interface usability (e.g., minimalistic interface).

Section 220 can include a traditional user input mechanism for conveying text exchanges within a group session. Section 220 can comprise of a traditional text input field and an actionable user interface button (e.g., Send button). In one embodiment, the traditional components of section 220 can be utilized to convey private exchanges within group session via a customizable notation. For example, a private exchange can be sent to users within close proximity utilizing a slash command notation (e.g., /p4). In another embodiment, customizable notations can be configured for each group session, context, and the like. For instance, enterprise specific notations can permit existing information technology policies to be implemented.

Section 222 can be a dedicated proximate exchange user input mechanism for conveying private exchanges to participants within a group session. Section 222 can include, but is not limited to, text input field, actionable user interface button, distance setting, and the like. Input field can be a traditional input text field able to receive user input. Actionable user interface button can be a traditional interface push button which can convey a private exchange entered into the input text field of section 222. In one instance, the actionable user interface button can be distinguished by a label (e.g., whisper) indicating the text exchange is a private exchange. The distance setting can permit rapid selection of distance values for a private exchange. In one instance, distance setting can be configured through a drop down selection box (e.g., P1).

In interface 260, customization of user interface 210 and/or system 300 can be achieved. Interface 260 can comprise of, but is not limited to, section 262, option 264, and setting 266. In one instance, interface 260 can be a pop-up dialog associated with a text exchange chat session (e.g., interface 210). In another instance, interface 260 can be presented in response to interaction with a text exchange application configuration option. For example, interface 260 can be presented when a user accesses a preference menu entry in a text exchange client.

In section 262, a proximity list for a text exchange session can be presented. Proximity list can present, but is not limited to, participant identities, corresponding proximity value, and the like. The proximity list can be organized in a variety of fashions based on user configuration, system settings, and the like. For example, the proximity list can be presented in ascending order of proximity permitting rapid assessment of participant distances. In one instance, the proximity list can correspond to a set of participants interacting within a group session of a text exchange.

In another instance, the proximity list can correspond to a set of users associated with a contact list of a text exchange application. In one embodiment, proximity list within section 262 can be user modifiable allowing facile manipulation of user distances.

Option 264 can be a configuration setting permitting automated assessment and assignment of proximity values to a participant. In one instance, option 264 can permit programmatic determination of proximity values for each participant within a group session in progress. In another instance, option 264 can allow automatic proximity assignment for users within a contact list of a text exchange application. In one embodiment, option 264 can be a checkbox interface element permitting activation and deactivation of option 264. In the embodiment, deactivation of option 264 can trigger historic proximity values to be re-associated with appropriate participants. For example, user assigned proximity values can be reassigned to participants when option 264 is disabled.

Setting 266 can be a configuration entity permitting themes to be associated with private exchanges and/or interface 210. Themes can include, but is not limited to, visual themes, aural themes, and the like. In one embodiment, themes can permit customized colorization of text exchanges for each proximity value of a participant. For instance, messages from participants with a proximity value of one can be presented in a yellow font color and messages from participants with a proximity value of two can be presented in a blue font color. In one embodiment, setting 266 can be a push button interface element permitting configuration of a theme through an interface screen (not shown). It should be noted that multiple themes can be supported for each participant, group session, and the like. It should be appreciated that theme setting 266 can be utilized with persistent chat rooms enabling flexible theme configuration and/or templating.

Drawings presented herein are for illustrative purposes and should not be construed to limit the invention in any regard. Interface 210, 260 can comprise of traditional and/or proprietary interface elements. Interface elements can include, but is not limited to, radio dialog, checkbox, push button, and the like. Functionality of interface 210, 260 can be a portion of a file menu, context menu, and the like. Interface 210, 260 can be a graphical user interface, text user interface, mixed-mode interface, and the like. It should be appreciated that section 222 can be an optional component of interface 210. In one instance, interface 210 can be associated with audio/video interface components such as video conferencing interfaces.

Figure 3:
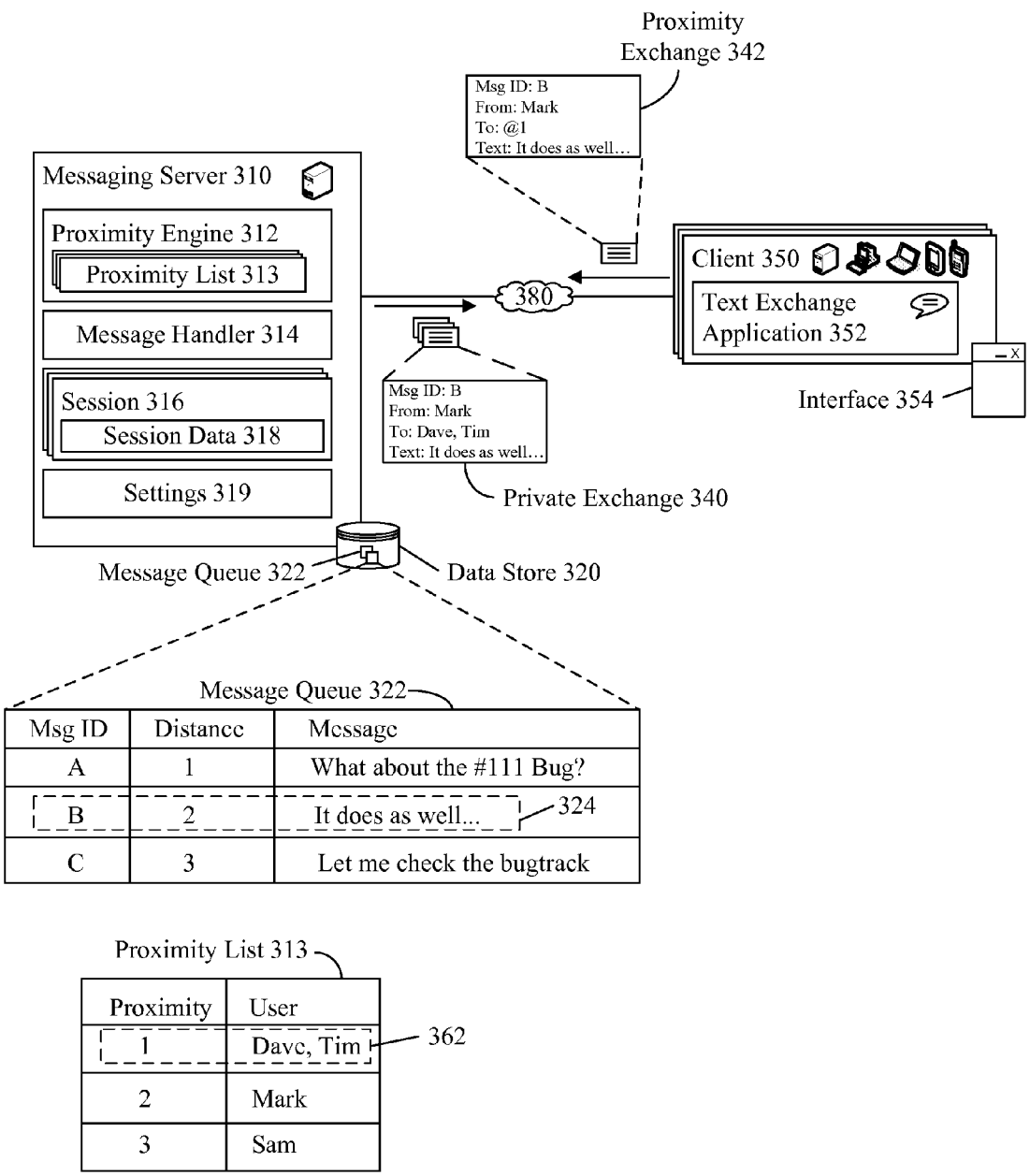
FIG. 3 is a schematic diagram illustrating a system for dynamic proximity based text exchanges or messaging within a group session in accordance with an embodiment of the inventive arrangements disclosed herein.

FIG. 3 is a schematic diagram illustrating a system 300 for dynamic proximity based text exchanges or messaging within a group session in accordance with an embodiment of the inventive arrangements disclosed herein. System 300 can be present in the context of method 100 and interface 210, 260. In system 300, a messaging server can utilize proximity and distance values to enable private exchanges to be communicated to a sub-group of participants within a group text exchange session. System 300 can be communicatively linked via network 380 which can include, but is not limited to, private network, public network, virtual private network, and the like.

As used herein, exchange 340, 342 can be one or more text-based exchanges communicated in real-time associated with a text exchange application (e.g., application 352). Exchange 340, 342 can comprise of, but is not limited to, message identifier, sender information, recipient information, thread identifier, session identifier, message text, and the like. Sender and recipient information can be group session participant information, including, but not limited to, a user identity, an email address, a resource, and the like. For instance, sender/recipient information can conform to a user @domain/resource syntax (e.g., mark @ibm.com/1234).

In one embodiment, proximate exchange 342 and/or private exchange 340 can conform to an Extensible Markup Language (XML) stanza associated with an Extensible Messaging and Presence Protocol (XMPP). In one instance, proximate exchange 342 can be a "groupchat" message type and private exchange 340 can be a "chat" message type of an XMPP protocol. That is, server 310 can translate a "groupchat" type message into one or more "chat" messages which can be privately conveyed to selected participants within the group session. In one instance, message 340 can be a "normal" message type associated with an XMPP protocol.

As used herein, a proximate exchange 342 can be a text exchange associated with a distance value. In one embodiment, the distance value can be stored within the "To" field of the message 342. In another instance, the distance value can stored within a customized tag (e.g., <Dist='3'>). In another instance, the proximity value can be stored within the message body (e.g., message text) of the message 342. In one embodiment, a priority element can be overloaded to store distance information (e.g., <Priority='3'>). A private exchange 340 can be a text exchange associated with a recipient (e.g., participant) within a group session. For example, private exchange can be message 340 associated with multiple recipients Dave, Tim.

It should be appreciated that system 300 describes one embodiment of private messaging within a group session. In other embodiments, each message (e.g., private exchange and traditional text exchange) can be associated with a proximity value.

In one embodiment, a message queue can be utilized to store incoming proximate exchanges and/or outgoing private exchanges. It should be appreciated that the message queue 322 can be an optional component.

Messaging server 310 can be a hardware/software component for communicating text exchanges and/or private exchanges within a text exchange session 316. Server 310 can comprise of, but is not limited to, proximity engine 312, message handler 314, session 316, settings 318, data store 320, and the like. In one instance, server 310 can be a component of an IBM LOTUS SAMETIME server. In another instance, server 310 can be a component of an instant message service center (IMSC) within a mobile telephony network.

Proximity engine 312 can be a hardware/software component for computing proximity relationships between a participant and a private exchange within a group session of a text exchange. Engine 312 can utilize proximity list 313 to determine which participant is associated with a private exchange. Based on a proximity value associated with a text exchange (e.g., text exchange 342), engine 312 can assess relevant participants to which the private exchange can be delivered. For example, a text exchange 342 with a proximity value of one can be conveyed to appropriate participants (e.g., Dave, Tim) utilizing proximity information 362. In one embodiment, engine 312 can convey private exchanges to queue 322 upon processing completion. In the embodiment, message handler 314 can communicate private exchanges within queue 322 to relevant recipients.

Proximity list 313 can be one or more datasets for establishing the proximity value associated with a participant. List 313 can be dynamic and/or static based on system 300 configuration parameters. In one embodiment, list 313 can be stored within proximity engine 312, session data 318, settings 319, data store 320, client 350, text exchange application 352, and the like. List 313 can conform to one or more data structures including, but not limited to, an array, an associative array, a link list, a hash table, and the like. In one embodiment, list 313 can act as a filtering mechanism permitting proximity filtering to be performed. In the embodiment, a filter can be associated with each proximity value permitting text exchanges to be filtered within the existing session.

Message handler 314 can be a hardware/software component for receiving and conveying text exchanges and/or private exchanges within a group session of a text exchange session. Handler 314 can receive proximate exchange 342 which can be stored within queue 322 as message 324. Handler 314 can access messages within queue 322 and determine when a message is associated with a proximity value which can be converted into a private exchange. Handler 314 can notify engine 312 when a message within queue 322 requires processing. In one instance, notification can include, but is not limited to, message identity, session identifier, message hash, and the like. Upon notification, engine 312 can process appropriate messages.

Session 316 can be a text exchange session associated with a group session. Session 316 can comprise of, but is not limited to, session identifier, session data 318, proximity list 313, session settings, user preferences, and the like. Session 316 can be associated with text exchange application 352 and/or interface 354. It should be appreciated that session 316 can be managed by server 310, client 350, and the like. In one instance, a group session can be utilized for each proximity value associated with the group session. For instance, if a group session comprises of five proximity levels (e.g., 1-5), five text exchange sessions can be created to track messages for each proximity level.

Session data 318 can be one or more datasets associated with session 316 of a text exchange application 352. Data 318 can include, but is not limited to, proximity information, participant information, network information, text exchange client information, and the like. Data 318 can be analyzed to determine participant proximity upon initiation of the session 316. In one embodiment, data 318 can be periodically synchronized with proximity information associated with list 313 when modifications occur enabling real-time private exchanges to be achieved. For instance, as a participant presence information changes (e.g., moving closer to a geographic location), system 300 can adjust the participant's proximity value in real-time or near real-time.

Settings 319 can be one or more configuration parameters for establishing and/or controlling the behavior of system 300. Settings 319 can include, but is not limited to, engine 312 settings, handler 314 configuration options, text exchange client settings, theme settings, and the like. Settings 319 can be presented within one or more interfaces including, but not limited to, interface 210, 260, 354, and the like.

Message queue 322 can be a hardware/software entity able to store a traditional text exchange, a proximate exchange, a private exchange, and the like. Message queue 322 can be a traditional and/or proprietary text exchange queue. In one embodiment, message queue 322 can comprise of, but is not limited to, a message identifier, a distance value, a message text, a session identifier, and the like. Message queue 322 can be one or more data structures including, but not limited to, a stack, a queue, a heap, and the like.

Data store 320 can be a hardware/software component able to store message queue 322, proximity list 313, and the like. Data store 320 can be a component of a Storage Area Network (SAN), Network Area Storage (NAS), and the like. Data store 320 can be a Relational Database Management System (RDBMS), Object Oriented Database Management System (OODBMS), and the like.

Client 350 can be a hardware/software computing entity able to establish a group session 316 with two or more computing entities. Client 350 can include, but is not limited to, text exchange application 352, interface 354, and the like. Client 350 can be a desktop computer, laptop, portable computing device, tablet computing device, mobile phone, portable media player, portable digital assistant, and the like. Client 350 can permit the execution of text exchange application 352 and/or presentation of interface 354.

Text exchange application 352 can be a hardware/software component for communicating one or more text exchanges and/or private exchanges to a participant within a group session. Text exchange application 352 can be, but is not limited to, desktop application, Web-based application, and the like. In one instance, text exchange application 352 can be a JAVA 2 ENTERPRISE EDITION software. Text exchange application 352 can be associated with a chat window (e.g., interface 210), contact list (e.g., interface 354), video playback window, and the like. In one instance, application 352 can be an IBM LOTUS SAMETIME client application.

Interface 354 can be one or more user interfaces permitting user interaction with a text exchange and/or a private exchange within a group session. Interface 354 can include, but is not limited to, chat window, contact list, settings interface, and the like.

In one instance, system 300 can support offline messaging, enabling participants to receive private exchanges during communication failures. For example, system 300 can store private exchanges within queue 322 when a participant is offline and present the private exchange when the participant is online. That is, system 300 can account for network outages which can occur due to network latency, client technical issues, and the like.

It should be noted system 300 can support traditional and/or proprietary security mechanisms, including but not limited to, encryption (e.g., TLS), captchas, and the like. In one embodiment, selective encryption for private exchanges can be enabled permitting private messaging within secure environments to be realized.

It should be understood system 300 can conform to traditional client-server architecture, peer-to-peer architecture, and the like. In one instance, system 300 can be a component of a Service Oriented Architecture (SOA). In another instance, system 300 can be a functionality of an Application Programming Interface (API). Further, system 300 components can operate synchronously, asynchronously, and any combination thereof. System 300 components can be associated with one or more network elements, cloud computing elements, distributed computing entities, and the like. For example, system 300 can be associated with a presence server enabling presence information to be obtained for each participant within a group session.

Drawings presented herein are for illustrative purposes only and should not be construed to limit the invention in any regard. In one embodiment, system 300 can be integrated into an existing text exchange infrastructure enabling a traditional text exchange architecture to be extended. For example, system 300 functionality can be introduced into traditional text exchange clients such as MEEBO, DIGSBY, and the like. System 300 can utilize traditional and/or proprietary text exchange protocols including, but not limited to, XMPP, Internet Relay Chat (IRC), Open System for Communication in Realtime (OSCAR), and the like.

It should be appreciated that server 310 can be fault tolerant and can operate in the absence of presence information, client/server errors and the like. When failures within server 310 occur, appropriate error messages and/or system events can be triggered and conveyed to relevant entities.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for proximity based text exchange comprising:
   receiving a proximity exchange associated with a distance value n, wherein the proximity exchange is a text exchange conveyed by a text exchange application, wherein the text exchange application is linked to a group session, wherein the group session comprises of a plurality of participants, wherein each of the plurality of participants is associated with a proximity value m, wherein the text exchange is a real-time text based communication between the plurality of participants utilizing a plurality of computing devices;
   determining at least one participant of the group session to receive the proximity exchange based on the distance value associated with the proximity exchange and the proximity value associated with the at least one participant;
   communicating the proximity exchange to a computing device utilized by the at least one participant when the proximity value of the at least one participant is equivalent to the distance value of the proximity exchange; and
   presenting the proximity exchange in at least one of visually and aurally distinct manner within an interface of the text exchange application.

2. The method of claim 1, further comprising:
   comparing the proximity value associated with at least one participant with the distance value associated with the proximity exchange;
   when the distance value is less than the proximity value, conveying the proximity exchange to the computing device utilized by the at least one participant; and when the distance value is greater than the proximity value, not conveying the proximity exchange to the computing device utilized by the at least one participant.

3. The method of claim 1, wherein n and m is a real number integer value.

4. The method of claim 1, wherein the proximity value is automatically computed utilizing information associated with a participant, wherein the information is at least one of a presence information, a geographic location, a metric, and a security permission.

5. The method of claim 1, wherein the text exchange application is an IBM LOTUS SAMETIME.

6. The method of claim 1, wherein the distance value associated with the proximity exchange is set via a user determined notation, wherein the notation is an alphanumeric notation.

7. The method of claim 1, wherein a proximity based filter for the group session is established, wherein participants within a defined proximity of each other are able to view proximity exchanges, wherein proximity exchanges occur within the same session as group exchanges, wherein group exchanges are text exchanges visible to each participant of the group session.

8. A system for proximity based text exchange comprising:
one or more processors;
at least one memory storing program instructions executable by the one or more processors;
a message handler, comprising at least a portion of the program instructions, able to receive a text exchange associated with a distance value, wherein the text exchange is conveyed by an text exchange application, wherein the text exchange application is linked to a group session comprising of a plurality of participants, wherein the text exchange is a real-time text based communication between the plurality of participants utilizing a plurality of computing devices; and
a proximity engine, comprising at least a portion of the program instructions, configured to identify a distance value associated with the text exchange and determine at least one recipient of the received text exchange based on the distance value associated with the proximity exchange and the proximity value associated with the at least one recipient; and
an engine, comprising at least a portion of the program instructions, configured to communicate the proximity exchange to a computing device utilized by the determined at least one recipient when the proximity value of the at east one recipient is equivalent to the distance value of the proximity exchange.

9. The system of claim 8, further comprising:
a message queue capable of temporarily storing the received text exchange, wherein the text exchange comprises of a distance value and a message text.

10. The system of claim 8, further comprising:
a proximity list comprising of a user identity and proximity value, wherein the user identity is a unique identifier.

11. The system of claim 8, wherein the proximity engine automatically determines a proximity value associated with a plurality of participants associated with the group session.

12. The system of claim 8, wherein the system is a middleware software associated with an IBM LOTUS SAMETIME.

13. The system of claim 8, wherein the proximity value is determined dynamically based on a context, wherein the context is at least one of an organizational hierarchy and a social network interaction.

14. The system of claim 8, wherein the proximity value is associated with a contact of the text exchange application.

15. A computer program product comprising a non-transitory computer readable storage medium having computer usable program code embodied therewith, the computer usable program code comprising:
computer usable program code stored in a non-transitory storage medium operable to receive a text exchange associated with a distance value n, wherein the text exchange is conveyed by an text exchange application, wherein the text exchange application is linked to a group session, wherein the group session comprises of a plurality of participants, wherein each of the plurality of participants is associated with a proximity value m, wherein the text exchange is a real-time text based communication between the plurality of participants utilizing a plurality of computing devices;
computer usable program code stored in a non-transitory storage medium operable to determine at least one participant of the group session to receive the text exchange based on the distance value of the text exchange and the proximity value associated with the at least one participant;
computer usable program code stored in a non-transitory storage medium operable to communicate the text exchange to a computing device utilized by the at least one participant when the proximity value of the at least one participant is equivalent to the distance value of the text exchange; and
computer usable program code stored in a non-transitory storage medium operable to present the text exchange in at least one of visually and aurally distinct manner within an interface of the text exchange application.

16. The computer program product of claim 15, wherein the proximity value is automatically computed utilizing information associated with a participant, wherein the information is at least one of a presence information, a geographic location, a metric, and a security permission.

17. The computer program product of claim 15, wherein the text exchange application conforms to an Extensible Messaging and Presence Protocol (XMPP) protocol.

18. The computer program product of claim 15, wherein the received text exchange is a group chat type message and the communicated text exchange is a chat type message.

19. The computer program product of claim 15, wherein the proximity value m is associated with a text exchange context, wherein the context is associated with at least one of an organizational hierarchy and a social network structure.

20. The computer program product of claim 15, wherein the distance value n of the text exchange is automatically determined based on a user specified notation associated with the message text of the text exchange.

* * * * *